United States Patent
Heeg et al.

(10) Patent No.: US 10,177,423 B2
(45) Date of Patent: Jan. 8, 2019

(54) TEMPERATURE CONTROL DEVICE FOR CONTROLLING THE TEMPERATURE OF A BATTERY

(71) Applicant: Mahle International GmbH, Stuttgart (DE)

(72) Inventors: Oliver Heeg, Schwieberdingen (DE); Dominique Weinmann, Rottenburg (DE); Oleksandr Pavlov, Herrenberg (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/730,364

(22) Filed: Jun. 4, 2015

(65) Prior Publication Data

US 2015/0357688 A1 Dec. 10, 2015

(30) Foreign Application Priority Data

Jun. 4, 2014 (DE) .................. 10 2014 210 570

(51) Int. Cl.
| | |
|---|---|
| *H01M 10/625* | (2014.01) |
| *H01M 10/653* | (2014.01) |
| *H01M 10/6556* | (2014.01) |
| *H01M 10/6554* | (2014.01) |

(52) U.S. Cl.
CPC ....... *H01M 10/625* (2015.04); *H01M 10/653* (2015.04); *H01M 10/6554* (2015.04); *H01M 10/6556* (2015.04); *H01M 2220/20* (2013.01); *Y10T 29/4911* (2015.01)

(58) Field of Classification Search
CPC ............. H01M 10/625; H01M 10/653; H01M 2220/20
See application file for complete search history.

(56) References Cited

U.S. PATENT DOCUMENTS

| | | | |
|---|---|---|---|
| 8,465,864 B1 | 6/2013 | Kwak et al. | |
| 2007/0231619 A1* | 10/2007 | Strobel | ............... C25B 9/203 429/457 |
| 2009/0220850 A1* | 9/2009 | Bitsche | ............... H01M 2/1241 429/50 |
| 2011/0212356 A1 | 9/2011 | Tennessen et al. | |
| 2012/0121946 A1* | 5/2012 | Eckstein | ............. B60L 11/1874 429/9 |

(Continued)

FOREIGN PATENT DOCUMENTS

| | | | | |
|---|---|---|---|---|
| DE | 102008059952 A1 | | 6/2010 | |
| DE | 102011084002 A1 | | 4/2013 | |
| DE | 102012221689 | * | 5/2014 | .......... H01M 10/625 |

OTHER PUBLICATIONS

Machine Translation DE102012221689A1.*
English abstract for DE-102008059952.

*Primary Examiner* — Miriam Stagg
*Assistant Examiner* — Victoria H Lynch
(74) *Attorney, Agent, or Firm* — Fishman Stewart PLLC

(57) ABSTRACT

A temperature control device for a battery may include a fluid duct being flowable at least one of through and around by a fluid. The fluid duct may be delimited by at least one duct wall composed of an electrically conductive material. An outer side of the duct wall facing away from the fluid may include at least one electrically insulating insulation layer disposed thereon via at least one of a screen printing process and a stencil printing process. The at least one insulation layer may be composed of a plastic material.

19 Claims, 5 Drawing Sheets

(56) References Cited

U.S. PATENT DOCUMENTS

| | | |
|---|---|---|
| 2013/0202924 A1 | 8/2013 | Kwak et al. |
| 2013/0224574 A1* | 8/2013 | Favaretto ................ B60K 1/04 429/186 |
| 2013/0337310 A1* | 12/2013 | Omura ................ H01M 2/1077 429/120 |
| 2014/0023906 A1* | 1/2014 | Hashimoto ......... H01M 2/1077 429/120 |
| 2014/0220397 A1 | 8/2014 | Hirsch et al. |

* cited by examiner

TEMPERATURE CONTROL DEVICE FOR CONTROLLING THE TEMPERATURE OF A BATTERY

CROSS-REFERENCE TO RELATED APPLICATIONS

This application claims priority to German Patent Application No. 10 2014 210 570.6, filed Jun. 4, 2014, the contents of which are hereby incorporated by reference in its entirety.

TECHNICAL FIELD

The invention relates to a temperature control device for controlling the temperature, in particular a cooling device for the cooling and/or a heating device for the heating, of a battery, and a battery arrangement with such a temperature control device. The invention also relates to a motor vehicle with such a battery arrangement. Finally, the invention relates to a method for producing such a temperature control device.

BACKGROUND

Rechargeable battery systems for electric vehicles with a purely electric drive and for hybrid vehicles and vehicles with fuel cell drive are the subject of current research. At present, in the said types of vehicle, lithium-ion batteries are preferably used, which are distinguished by a high energy density and an only slightly marked, undesired memory effect. The capability of a rechargeable battery to reliably supply various electric consumers installed in motor vehicles with electrical energy depends to a considerable extent on the thermal conditions prevailing in the environment of the battery. This is because both the electrochemical processes occurring in the battery in the provision and also in the receiving of electrical energy—in the sense of recharging—are dependent to a not insignificant extent on the operating temperature of the battery. Extensive investigations of various lithium-ion-based battery systems have shown, for instance, that below a critical temperature, for instance in the region of approximately 0° C., the electrical energy density made available by the battery decreases greatly compared with higher operating temperatures. Below this temperature, in addition damage to the Li-ion cell can occur during charging.

The provision of thermally well-defined environmental conditions is therefore crucial for a reliable and interference-free operation of said batteries—this applies not only for said lithium-ion-based batteries, but generally for any rechargeable battery systems. With regard to the considerable temperature fluctuations occurring under normal operating conditions for instance in a motor vehicle, this means that these must be compensated by suitable temperature control devices coupled thermally with the battery, in order to keep the environmental temperature of the battery—and hence also the temperature of the battery itself—within a temperature interval specified, for example, by the manufacturer.

Temperature control devices with heat exchangers are known from the prior art, which are based for example on fluid ducts in the form of cooling plates or collector/tube systems which form a cooling channel, which is flowed through by a heat transmission medium, for example a coolant. The battery cells which are to be temperature-controlled are brought to lie respectively flat against at least one duct wall of the heat exchanger of the temperature control device. In this way, a thermal contact is produced between the battery and the coolant, so that the coolant can extract heat from the battery cells and their temperature can consequently be kept below a maximum permissible threshold value.

In such temperature control devices, it proves to be significant, however, that both for the duct walls of the fluid ducts, and also for the housing, a material with high thermal conductivity must be selected, if a highly effective thermal coupling is to be achieved between battery and coolant. Metals which have the desired characteristics with regard to the thermal conductivity therefore come into consideration to a particular extent. If, however, a metal is selected as material for a heat exchanger of the temperature control device cooperating with the battery or respectively for the battery housing, then an electrically conducting connection also occurs between the heat exchanger and the battery,— which connection is undesired for safety considerations —, when these two components are brought mechanically in contact with one another. Such an electrical connection could be avoided if the heat exchanger were arranged at a sufficient distance from the battery. However, owing to the air gap then present, this would lead to an unacceptable reduction of the thermal coupling between battery and heat exchanger.

For an effective thermal coupling between battery cells and heat exchanger with simultaneous electrical insulation of the two components with respect to one another, it is therefore usual to provide a thermal interface with electrically insulating characteristics between these two components. From DE 10 2008 059 952 B4 a battery with several battery cells and a generic temperature control device constructed as a cooling device for cooling the battery cells is known. A metallic base body of the temperature control device is equipped with an electrically insulating insulation layer. This is an injection moulded layer of a plastic injected onto the base body.

It is further known from the prior art to arrange thermally highly conductive materials with elastic characteristics between the individual battery cells and the temperature control device. These are able to compensate the formation of undesired intermediate spaces between individual battery cells and the duct walls of the fluid duct, caused for instance owing to manufacturing or installation tolerances. Heat-conducting foils, heat-conducting pastes or heat-conducting adhesives are used for use as a conventional thermal interface between the battery cells and the duct wall.

It proves to be a problem in the said heat-conducting pastes that their function in the practical operation of the temperature control device, typically in a motor vehicle, cannot be guaranteed for instance owing to regularly occurring vibrations. The mentioned heat-conducting foils, on the other hand, have the disadvantage that they are expensive to purchase and their bubble-free application on the temperature control device is complex with regard to the technical process. In addition, owing to their only limited elastic deformability they can only compensate to a limited extent variations in the dimensions of the intermediate spaces between the temperature control device and the individual battery cells.

It is therefore an object of the present invention to provide an improved embodiment for a temperature control device, in which the problems discussed above no longer occur.

The said object is solved by the subject of the independent claims. Preferred embodiments are the subject of the dependent claims.

SUMMARY

The basic idea of the invention is, accordingly, to provide on an electrically conductive duct wall of a fluid duct of the temperature control device an electrically insulating insulation layer of a plastic, which is applied by means of screen printing and/or stencil printing. The application of a plastic onto the metallic duct wall permits the formation of almost any desired print patterns to be realized in the electrical insulation layer by suitable selection of the print layout which is to be used. Thereby, it becomes possible to adapt the insulation layer to the geometry of the individual battery cells of the battery and to only use material where this is actually required.

Compared with conventional insulation layers which are based on heat-conducting paste or a heat-conducting foil, on the basis of the insulation layer according to the invention in addition the same degree of thermal coupling can be achieved with reduced layer thickness. In addition to the not insignificant saving on material, cost advantages also occur, because the applying of a plastic by means of screen printing and/or stencil printing involves considerably reduced manufacturing costs compared with conventionally produced insulation layers.

A temperature control device according to the invention for cooling a battery having at least one battery cell comprises a fluid duct, able to be flowed through by a fluid, in particular by a heat transmission medium, e.g. coolant, which has at least one electrically conducting duct wall, e.g. of a metal. On an outer side of the duct wall at least electrically insulating insulation layer, applied by means of screen printing and/or stencil printing, is provided.

In a preferred embodiment, the plastic of the electrically insulating insulation layer is an elastomer. Elastomers are able to deform under compressive stress or tensile stress, which means that the insulation layer formed from an elastomer, owing to its elastic characteristics, can adapt to varying distances between individual battery cells and the outer side of the duct wall. It is therefore ensured that each individual intermediate space between a particular battery cell and the duct wall is filled by the insulation layer. Silicone and polyurethane (PU) prove to be particularly suited to use as elastomer in the insulation layer.

These basic materials can be used in a further preferred embodiment to increase the thermal conductivity, provided with fillers, e.g. aluminium oxide, boron nitride, or similar.

The use of the printing method essential to the invention makes it possible to produce the electrically insulating insulation layer in a preferred embodiment with a uniform layer thickness. In this way, it can be ensured that individual regions of the insulation layer are not formed with a layer thickness which is too small. Experimental investigations have shown that depending on the cell distance, values between 50 and 1000 µm with corresponding materials result in a compressibility of the insulation layer which brings about a particularly good mechanical and thermal contact of the layer both with all battery cells and also with the duct wall of the fluid duct.

By comparison, in another preferred embodiment, it can be advantageous to provide different regions of the insulation layer—designated below as layer sections—with different layer thicknesses. It is conceivable, for instance, to provide local regions on the duct wall, in which no battery cells are to be arranged, with an insulation layer of reduced layer thickness. Alternatively thereto, however, it is also conceivable to increase the layer thickness in this region, so that the insulation layer for the respective battery cell forms a recess in which the battery cells can be partially received.

In a further preferred embodiment, the electrically insulating insulation layer comprises at least two individual layers, preferably a plurality of individual layers, which are stacked on one another along a stacking direction, running orthogonally to the wall plane defined by the duct wall, on the outer side of the duct wall. In this way, the compressibility of the electrically insulating insulation wall can be adjusted.

In an advantageous further development of the invention, at least one individual layer extends completely over the duct wall, whereas at least one further individual layer is arranged only in sections on the duct wall. In this way, it can be ensured that the duct wall is completely insulated electrically with respect to the battery cells.

Particularly expediently, the fluid duct can be constructed as a flat tube, wherein duct wall, equipped with the insulation layer according to the invention, forms a part of the flat tube.

The invention also relates to a battery arrangement, in particular for a motor vehicle, with a temperature control device with one or more of the above-mentioned features. The battery arrangement has a battery which is thermally coupled with the duct wall, which battery in turn comprises at least one battery cell. The electrically insulating insulation layer is arranged here in a sandwich-like manner between the duct wall and the at least one battery cell. The invention also relates to a motor vehicle with such a battery arrangement.

Finally, the invention also relates to a method for the production of a temperature control device. In a first step a) of the method, an electrically insulating insulation layer of plastic is applied by means of screen printing and/or stencil printing onto an outer side of a duct wall, which is part of a fluid duct. In a second step b), a battery with at least one battery cell is applied on the insulation layer. The cross-linking or respectively hardening of the insulation layer, if applicable with the use of an active activation, e.g. by temperature increase or irradiation e.g. with UV light, can take place either before or after step b), preferably before step b), so that the temperature control device and the battery are not permanently stuck to one another.

Further important features and advantages of the invention will emerge from the subclaims, from the drawings and from the associated figure description with the aid of the drawings.

It shall be understood that the features mentioned above and to be further explained below are able to be used not only in the respectively indicated combination, but also in other combinations or in isolation, without departing from the scope of the present invention.

BRIEF DESCRIPTION OF THE DRAWINGS

Preferred example embodiments of the invention are represented in the drawings and are explained in further detail in the following description, wherein the same reference numbers refer to identical or similar or functionally identical components.

There are shown, respectively diagrammatically

DETAILED DESCRIPTION

Figure 1:
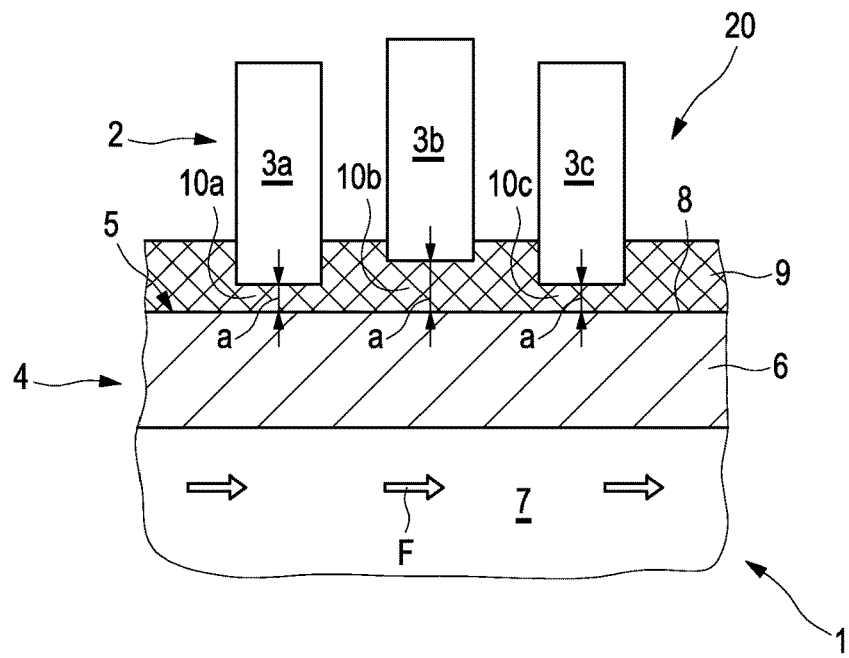
FIG. 1 an example of a temperature control device according to the invention in a rough diagrammatic and partial illustration, FIG. 2 a rough diagrammatic and partial illustration of the temperature control device of FIG. 1 according to another example, FIG. 3 a rough diagrammatic and partial illustration of the temperature control device of FIG. 1 according to another example, FIG. 4 a rough diagrammatic and partial illustration of the temperature control device of FIG. 1 according to another example, FIG. 5 a rough diagrammatic and partial illustration of the temperature control device of FIG. 1 according to another example, FIG. 6 a rough diagrammatic and partial illustration of the temperature control device of FIG. 1 according to another example FIG. 7A an elevated view of the temperature control device of FIG. 1 according to another example, FIG. 7B a rough diagrammatic and partial illustration of the temperature control device of FIG. 7A along the section line X-X, FIG. 8A an elevated view of the temperature control device of FIG. 1 according to another example, and FIG. 8B a rough diagrammatic and partial illustration of the temperature control device of FIG. 8A along the section line X-X.

FIG. 1 illustrates in a rough diagrammatic schematic illustration an example of a temperature control device 1 according to the invention for cooling a battery 2 with a plurality of battery cells, of which in FIG. 1 by way of example three battery cells 3a-3c are shown. A heat exchanger 4 of the temperature control device 1, which is flowed though by a fluid F serving as coolant, comprises a fluid duct 5, of which in FIG. 1 only a single duct wall 6, for example of a metal, is shown. The fluid duct 5 delimits a fluid channel 7, in which the fluid F flows. By thermal interaction of the battery cells 3a-3c with the fluid F through the duct wall 6, these deliver waste heat to the fluid F for cooling purposes. For this, the battery cells 3a-3c are arranged on an outer side 8 of the duct wall 6 of the fluid duct 5.

As FIG. 1 shows, an electrically insulating insulation layer 9 of a plastic is applied by means of screen printing and/or stencil printing on an outer side 8 of the duct wall 6 facing away from the fluid duct 7. The battery cells 3a-3c of the battery 2 can be mounted on this insulation layer 9 of the temperature control device 1. After completed mounting of the battery cells 3a-3c which are to be cooled, the insulation layer 9 is therefore arranged in a sandwich-like manner between the duct wall 6 and the battery cells 3a-3c. Particularly expediently, the fluid duct 5 can be constructed as a flat tube, wherein the duct wall 6, coated with the insulation layer 9 according to the invention, forms a part of such a flat tube.

The plastic of the electrically insulating insulation layer 9 is preferably an elastomer. Elastomers coming into consideration are, in particular, silicone or polyurethane (PU). Owing to the spring-elastic characteristics of elastomers, the insulation layer 9 can be adapted to varying distances a between the individual battery cells 3a-3d and the outer side 8 of the duct wall 6. Such a variation of the distances of individual battery cells 3a-3c can occur, for instance, owing to installation. This is shown in FIG. 1 by way of example by means of the central battery cell 3b, the distance of which to the duct wall 6 is greater than that of the two adjacent battery cells 3a, 3c. It can therefore be ensured that each individual intermediate space 10a-10c between the respective battery cell 3a-3c and the duct wall 6 is filled completely by the insulation layer 9. In this way, the desired thermal coupling of all battery cells 3a-3c, in particular of the battery cell 3b with increased distance, to the duct wall 6 and therefore also to the fluid F, is ensured, which for example would not be the case if after the mounting of the battery cells 3a-3c a cavity remained between the battery cell 3b and the duct wall 6.

Figure 2:
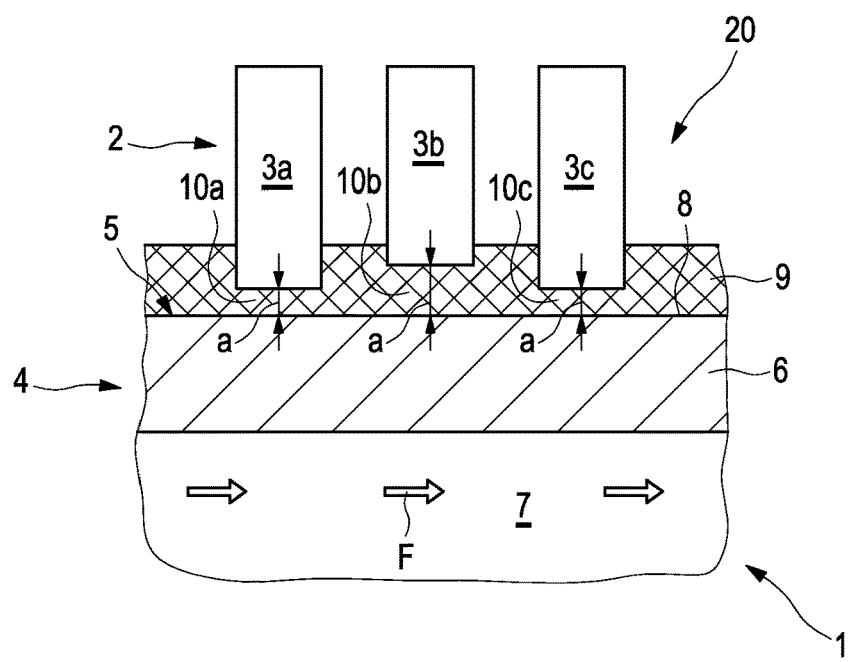

The same applies to the example shown in FIG. 2, which differs from that of FIG. 1 in that the increased distance a between the central battery 3b and the duct wall 6 does not come about due to installation, but rather owing to reduced external dimensions of the central battery cell 3b compared with the remaining battery cells 3a, 3c, due to manufacture.

The duct wall 6 with the electrically insulating insulation layer 9 and the battery cells 3a-3d arranged thereon form a battery arrangement 20. The use of a screen printing and/or stencil printing process for applying the insulation layer 9 on the duct wall 6 makes it possible to provide the insulation layer 9, before the mounting of the battery cells 3a-3d of the battery 2, both in the example of FIG. 1 and also in the example of FIG. 2, with a uniform layer thickness. In this way, it can be ensured that individual regions of the insulation layer 9 are not produced with a layer thickness which is too small. Experimental investigations have shown that, depending on material characteristic and cell offset, values between 50 and 1000 μm result in a compressibility of the insulation layer 9, on arranging of the battery cells 3a-3d on the duct wall 6, which brings about a particularly good mechanical or respectively thermal contact of the insulation layer 9 both with the battery cells 3a-3d and also with the duct wall 6 of the fluid duct 5. Layer thicknesses between 30 and 500 μm are sufficient for the electrical insulation— according to dielectric strength of the material and insulation requirement. If applicable (not shown here), a further electrically non-insulating layer can be applied for compensating the offset and/or different dimensions of the various battery cells 3a-3d onto the insulation layer 9, which electrically non-insulating layer serves for a more homogeneous heat transmission between the duct wall 6 and the battery cells 3a-3d.

Figure 3:
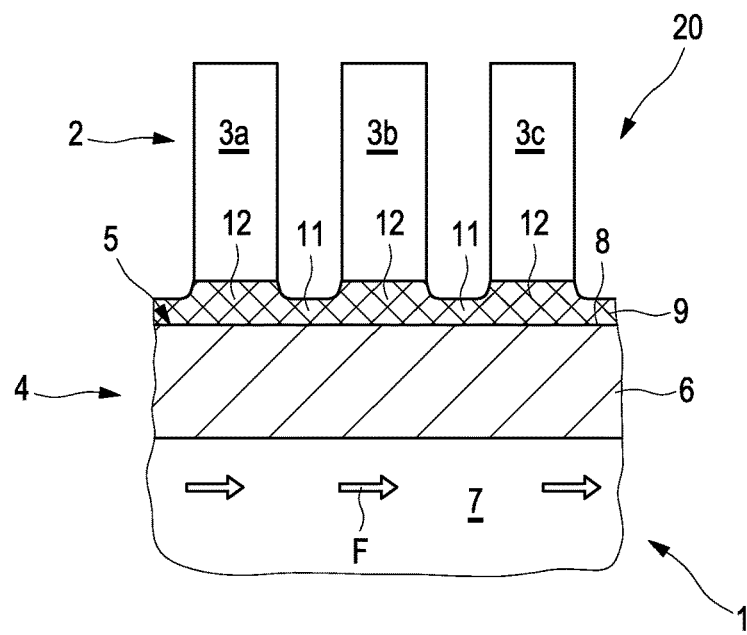
Figure 4:
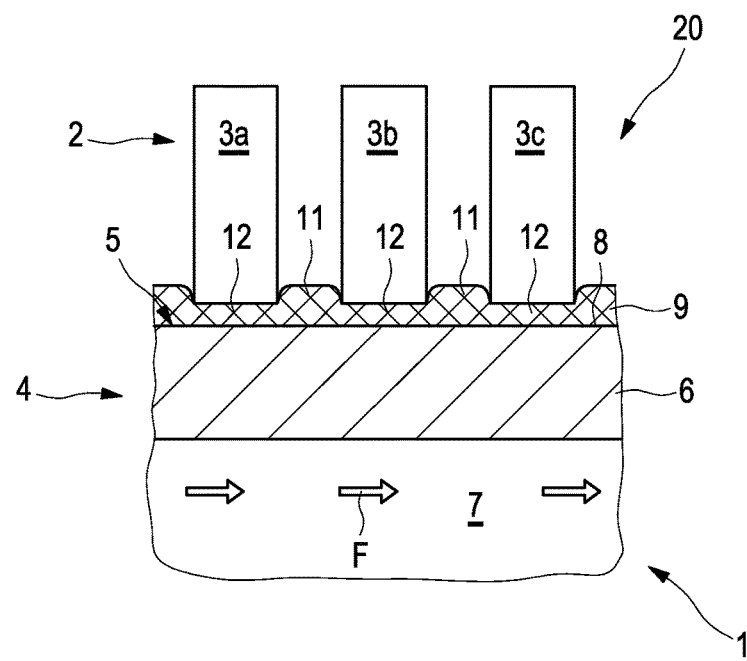

In a variant of the example of FIGS. 1 and 2, the electrically insulating insulation layer 9 can be provided in a targeted manner with a variable layer thickness. Such a scenario is shown by the example of FIG. 3, in which the battery cells 3a-3c, which are still to be mounted on the insulation layer 9, are shown in a dashed representation. It can be seen that the insulation layer 9, in the regions 11 on the outer side 8 of the duct wall 6, in which no battery cells 3a-3c are to be arranged, is provided with a reduced layer thickness compared with the regions 12, in which the battery cells 3a-3c are to be in contact mechanically with the insulation layer. Alternatively thereto, however, it is also conceivable to increase the layer thickness precisely in these regions, so that the insulation layer for the respective battery cell forms a virtual "trough-like" recess, in which it can be partially received. Such a scenario is shown, by way of example, by FIG. 4. It shall be understood that the variants shown in FIGS. 3 and 4 can be both combined with each other and also with the example scenarios shown in FIGS. 1 and two.

Figure 5:
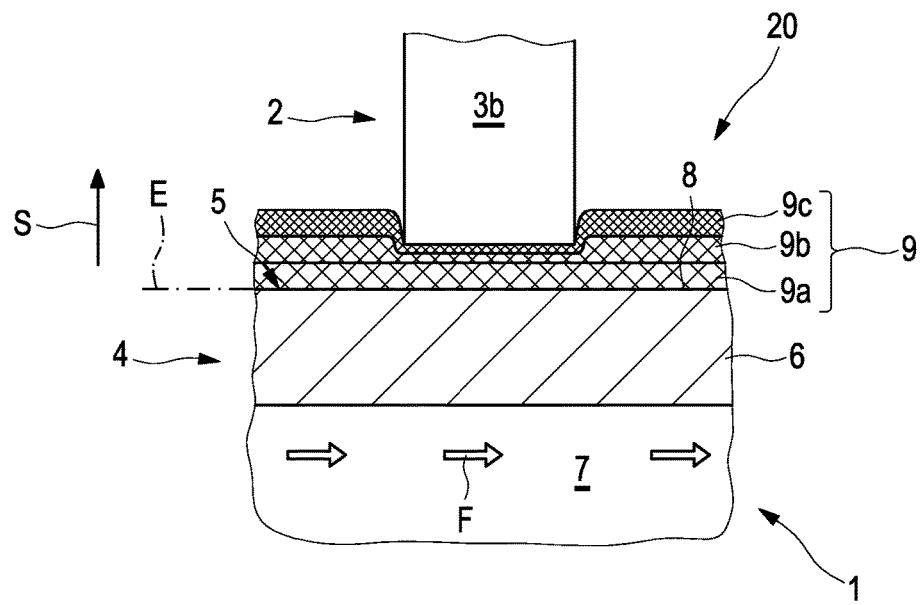

FIG. 5 shows a further variant, which is able to be combined with the examples shown in FIGS. 1 to 4. Accordingly, the electrically insulating insulation layer 9 can be formed not only from a single layer of uniform or varying layer thickness, but from at least two individual layers of different layer material. These can be stacked on one another along a stacking direction S, as illustrated in FIG. 5. Said stacking direction S extends orthogonally to a wall plane E defined by the duct wall 6. In the example of FIG. 5, the insulation layer 9 comprises three individual layers 9a, 9b, 9c, but in variants a different number of individual layers is also possible. The individual layers 9a-9c are produced from different plastics and can have individual layer thicknesses. On the mounting of the battery cells 3b, the individual layers 9b, 9c are typically compressed, as shown in FIG. 5.

Figure 6:
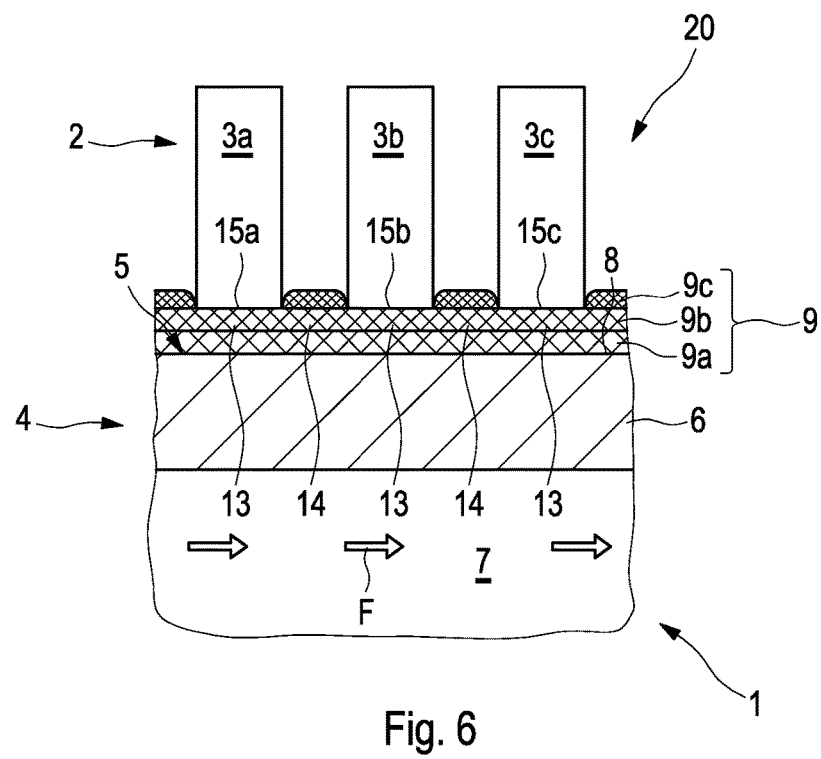

FIG. 6 illustrates a further example of a temperature control device 1 according to the invention, in which the electrically insulating insulation layer 9 is formed on different sections of the duct wall 6 by a different number of individual layers 9a, 9b, 9c. In this way, the elastic characteristics and therefore the compression behaviour of the insulation layers can be adapted in an application-specific manner to different requirements. In the example of FIG. 6, the insulation layer 9 has two individual layers 9a, 9b with respectively different layer material in lateral regions 13 in which battery cells 3a-3d are arranged thereon. In lateral regions 14, on the other hand, in which no battery cells are provided—the regions 14 are therefore lateral intermediate spaces between adjacent battery cells 3a, 3b or respectively 3b, 3c—the insulation layer 9 has, on the other hand, three individual layers 9a-9c, stacked on one another, respectively of different layer material. The trough-like recesses 15a-15c, shown in FIG. 6, are produced, for receiving the battery cells 3a-3c. The individual layers 9a, 9b therefore extend completely over the duct wall 6, whereas the individual layer 9c is only arranged in sections on the duct wall 6. By means of the individual layers 9a, 9b, it is ensured that the duct wall 6 is completely insulated electrically with respect to the battery cells 3a-3c.

The use of a screen printing and/or stencil printing process according to the invention for the production of the electrically insulating insulation layer 9 also makes it possible to produce this with a plurality of layer sections 16, which with respect to a top view onto the duct wall 6 have a respectively identical or different marginal contour 17. In this connection, experimental investigations have shown that different distances between the individual battery cells 3a-3c and the duct wall 6, which are not known on mounting of the battery cells 3a-3c on the electrically insulating insulation layer 9, can be compensated particularly well when the layer sections 16 in top view onto the duct wall 6 are provided with the marginal contour 17 of a polygon, preferably a quadrilateral or a hexagon, most preferably a rectangle or a hexagon. The desired marginal contours 17 can be formed by the layer sections 16 respectively forming a polygon being equipped with an increased or reduced layer thickness with respect to the remaining regions of the electrically insulating insulation layer 9, as was already explained with the aid of FIGS. 3 and 4. Alternatively or additionally, the layer sections 16 can also be formed by an additional or absent individual layer 9a, 9b, 9c of the insulation layer 9.

Figure 7:
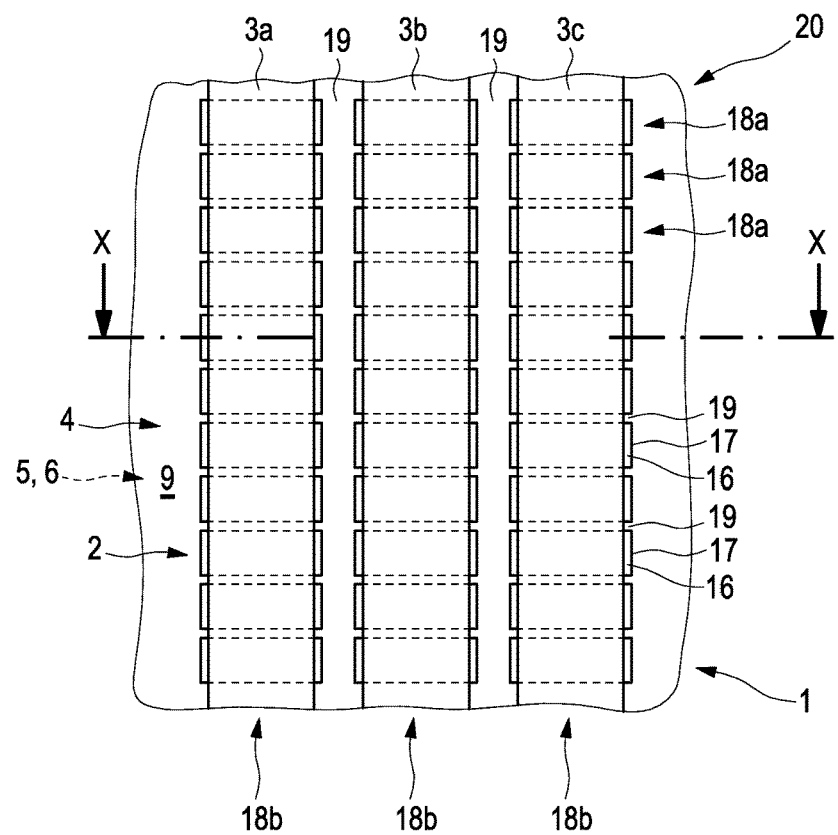
Figure 7:
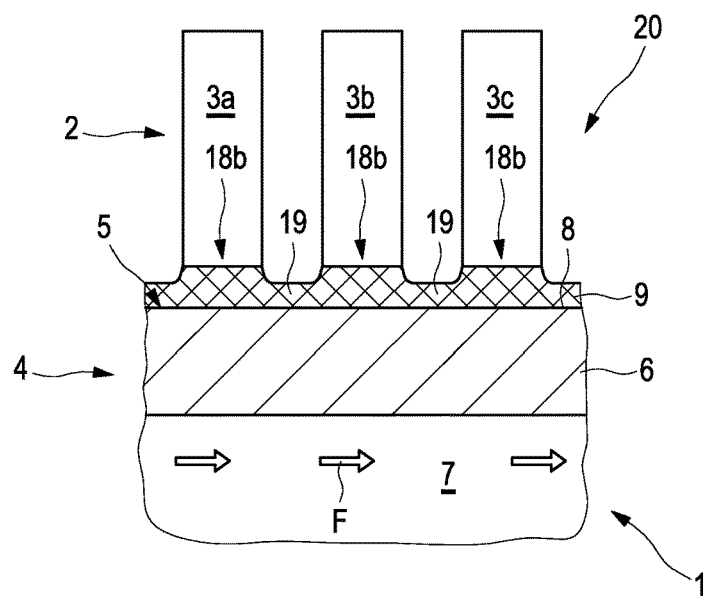

Particularly advantageous elastic characteristics of the electrically insulating insulation layer 9 are produced when the previously discussed layer sections 16 with identical marginal contour 17 in top view are arranged in a grid-like manner with at least two grid lines 18a and at least two grid gaps 18b on the outer side 8 of the duct wall 6. Such a scenario is shown by way of example in FIG. 7a, in which the layer sections 16 respectively have the marginal contour 17 of a rectangle and are arranged in a grid-like manner with respect to one another. A particular battery cell 3a-3c can be arranged on each grid gap 18b. The number of layer sections 16 shown by way of example in FIG. 7 can vary in variants of the example. In the regions or respectively intermediate spaces formed between the individual layer sections 16 of the grid, which constitute a base layer 19, the layer thickness of the electrical insulation layer 9 is reduced. This can be seen with the aid of FIG. 7b, which shows the electrical insulation layer 9 in a longitudinal section along the section line X-X of FIG. 7a. The distance between two adjacent grid gaps 18b here, as shown, can be greater than that between two adjacent grid lines 18a, or vice versa.

Figure 8:
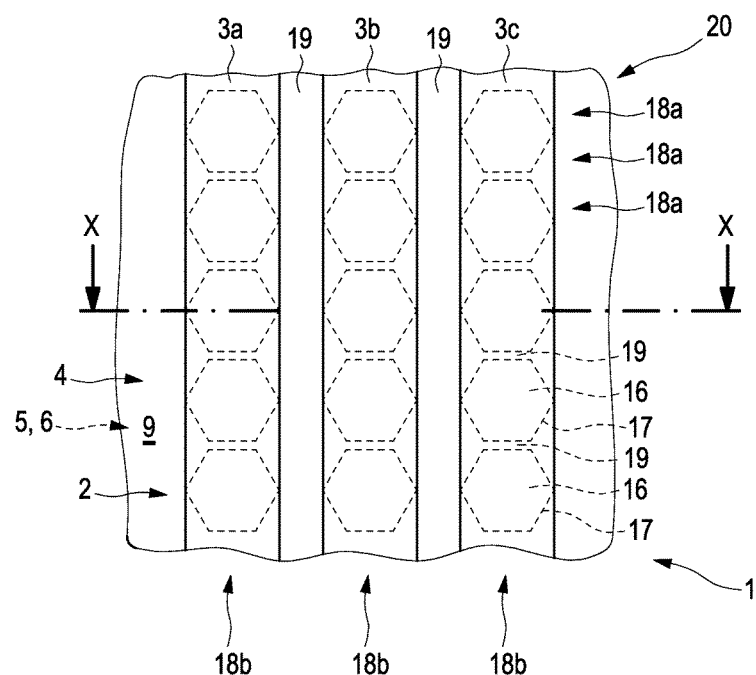
Figure 8:
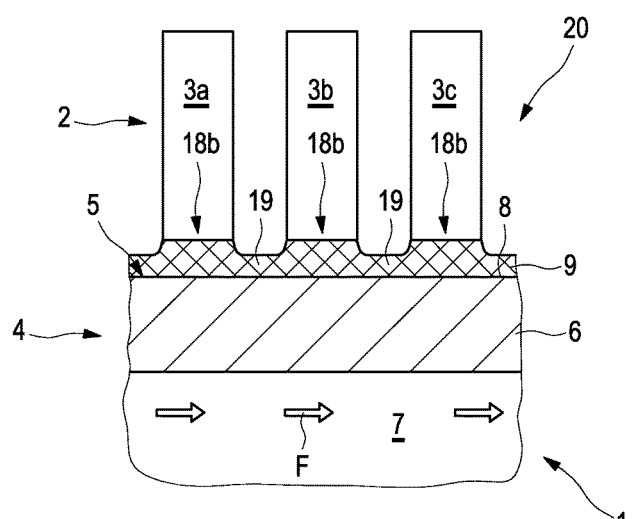

Finally, FIGS. 8a and 8b show a variant of the example of FIG. 7a or respectively 7b, in which the marginal contours 17 of the layer sections 16 have respectively the shape of a regular hexagon. The distance between two adjacent grid gaps 18b in the example of FIGS. 8a, 8b, just as in the example of FIGS. 7a, 7b, is greater than that between two adjacent grid lines 18a. As FIG. 8b shows, on the outer side 8 of the duct wall 6 between two adjacent grid gaps 18a, 18b or respectively two adjacent grid lines 18a, 18b, regions or respectively intermediate spaces, which form a base layer 19, are present, in which the layer thickness of the electrical insulation layer 9 is lower compared with the layer thickness of the layer sections 16. This is illustrated by FIG. 8b, which in an analogous manner to FIG. 7b shows a longitudinal section through the electrical insulation layer 9 along the section line X-X of FIG. 8a.

The invention claimed is:

1. A temperature control device for a battery, comprising:
   a fluid duct flowable at least one of through and around by a fluid, the fluid duct delimited by a duct wall composed of an electrically conductive material;
   at least one electrically insulating insulation layer disposed on an outer side of the duct wall facing away from the fluid via at least one of a screen printing process and a stencil printing process, the at least one insulation layer composed of a plastic material and having a first side interfacing with the duct wall and a second side disposed opposite the first side and facing away from the duct wall; and
   the at least one insulation layer including a plurality of layer sections arranged spaced apart from one another and an intermediate region disposed on the flow duct between the plurality of layer sections, the intermediate region having a reduced layer thickness compared to a layer thickness of the plurality of layer sections to provide the at least one insulation layer with a variable thickness; and
   wherein the plurality of layer sections are distributed relative to an elevated view onto the outer side of the duct wall in a grid-like arrangement with respect to one another where the plurality of layer sections are arranged along at least two grid lines and at least two grid gaps extending transversely to the at least two grid lines such that the second side of the at least one insulation layer defined at the intermediate region is depressed from the second side defined at the plurality of layer sections of the grid-like arrangement with respect to the outer side of the duct wall.

2. The temperature control device according to claim 1, wherein at least one of:
   the plastic material includes an elastomer; and
   the plastic material includes at least one of a mixing material and a filling material to increase the thermal conductivity of the at least one insulation layer.

3. The temperature control device according to claim 1, wherein the intermediate region separates the at least two grid gaps from one another and the at least two grid lines from one another, and wherein a distance between two adjacent grid gaps of the at least two grid gaps is greater than that between two adjacent grid lines of the at least two grid lines.

4. The temperature control device according to claim 1, wherein the at least one insulation layer further includes at least two individual layers arranged stacked on one another along a stacking direction running orthogonally to a wall plane defined by the outer side of the duct wall.

5. The temperature control device according to claim 4, wherein a first individual layer of the at least two individual layers extends completely over the outer side of the duct wall and defines the intermediate region, and wherein a second individual layer of the at least two individual layers is arranged stacked on top of the first individual layer in the stacking direction and only in sections along the outer side of the duct wall and includes the plurality of layer sections.

6. The temperature control device according to claim 1, wherein the at least one insulation layer further includes a base layer covering the outer side of the duct wall and the plurality of layer sections of the grid-like arrangement are disposed on the base layer, and wherein the base layer defines the intermediate region.

7. The temperature control device according to claim 6, wherein at least one layer section of the plurality of layer sections with respect to the elevated view onto the duct wall defines a geometry of a polygon.

8. The temperature control device according to claim 6, wherein the intermediate region is disposed between each of the plurality of layer sections of the grid-like arrangement.

9. The temperature control device according to claim 1, wherein the fluid duct is configured as a flat tube, wherein the duct wall forms a part of the flat tube.

10. A battery arrangement, comprising:
a temperature control device, including:
a fluid duct having a fluid channel for conveying a fluid in a flow direction, the fluid duct delimited by a duct wall composed of an electrically conductive material and defining an outer side facing away from the fluid channel;
at least one insulation layer composed of an electrically insulating elastomer material disposed on the outer side of the duct wall via at least one of a screen printing process and a stencil printing process, wherein the at least one insulation layer includes a plurality of individual layers arranged stacked on one another along a stacking direction, the stacking direction extending orthogonally to a wall plane defined by the outer side of the duct wall;
the plurality of individual layers including a first layer arranged on the outer side of the duct wall and a second layer arranged over the first layer, the second layer including a plurality of layer sections arranged spaced apart from one another along the duct wall;
the plurality of layer sections provided with respect to one another in a grid arrangement relative to an elevated view onto the outer side of the duct wall, the grid arrangement including the plurality of layer sections disposed along at least two grid lines extending in the flow direction and at least two grid gaps extending transversely to the at least two grid lines, wherein the at least two grid lines and the at least two grid gaps of the grid arrangement are separated from one another by an intermediate region extending between each of the plurality of layer sections; and a battery coupled thermally to the duct wall of the temperature control device and including at least one battery cell;
wherein the at least one insulation layer is disposed in a sandwich-like arrangement between the duct wall and the at least one battery cell of the battery;
wherein the plurality of layer sections of the second layer have a different layer thickness compared to that of the intermediate region, the layer thickness defined by a distance from the wall plane of the outer side of the duct wall to an outer side of the at least one insulation layer facing away from the duct wall; and
wherein the first layer defines the intermediate region disposed on the duct wall between each of the plurality of layer sections of the second layer, and wherein the intermediate region has a reduced layer thickness compared to the layer thickness of the plurality of layer sections.

11. The battery arrangement according to claim 10, wherein a number of the plurality of individual layers of the at least one insulation layer in a region of the at least one battery cell is one of greater and smaller than a number of the plurality of individual layers of the at least one insulation layer in a region spaced away from the at least one battery cell.

12. A method for producing a temperature control device, comprising the following steps:
applying via at least one of a screen printing process and a stencil printing process an electrically insulating insulation layer composed of a plastic material onto an outer side of a duct wall, the duct wall defining at least in part a fluid duct flowable through by a fluid, wherein applying the insulation layer onto the outer side of the duct wall includes providing at least two layer sections arranged spaced apart from one another along the flow duct with a different layer thickness than that of an intermediate region disposed between the at least two layer sections on the flow duct, the layer thickness defined by a distance from a wall plane of the outer side of the duct wall to an outer side of the insulation layer facing away from the duct wall;
arranging a battery comprising at least one battery cell on the insulation layer after providing the at least two layer sections;
cross-linking the plastic material of the insulation layer before arranging the battery on the insulation layer; and
wherein providing the at least two layer sections includes forming the at least two layer sections with a greater layer thickness than the layer thickness of the intermediate region before arranging the battery on the insulation layer such that the intermediate region is depressed from the at least two layer sections of the insulation layer with respect to the wall plane of the duct wall.

13. The battery arrangement according to claim 10, wherein the at least one battery cell includes at least two battery cells respectively arranged on and extending along the at least two grid gaps, and wherein the intermediate region is disposed between the at least two battery cells and extends along the duct wall between the at least two grid gaps.

14. The battery arrangement according to claim 10, wherein the first layer of the at least one insulation layer is a base layer extending completely over the duct wall and the plurality of layer sections are disposed on the base layer, the base layer defining the intermediate region disposed between each of the plurality of layer sections of the grid arrangement.

15. The battery arrangement according to claim 14, wherein the plurality of layer sections of the grid arrangement have a marginal contour with a polygonal shape relative to the elevated view, and wherein the intermediate region defined by the base layer has a reduced layer thickness compared to the layer thickness of the plurality of layer sections.

16. The method according to claim 12, wherein forming the at least two layer sections with the greater layer thickness than the layer thickness of the intermediate region before arranging the battery on the insulation layer includes providing the at least two layer sections with a marginal contour of a polygon with respect to an elevated view onto the duct wall, the marginal contour of the at least two layer sections being contiguous with the intermediate region.

17. The method according to claim 12, wherein cross-linking the plastic material includes hardening the insulation layer via at least one of heat and irradiation before arranging the battery on the insulation layer.

18. The method according to claim 12, wherein providing at least two layer sections further includes arranging a plurality of layer sections along at least two grid lines extending in a first direction and at least two grid gaps extending in a second direction transverse to the first direction to form a grid-like arrangement where the intermediate region extends between the at least two grid lines and the at least two grid gaps.

19. The method according to claim 12, wherein the at least one battery cell includes at least two battery cells, and wherein arranging the battery on the insulation layer includes arranging each of the at least two battery cells on a separate one of the at least two layer sections such that the intermediate region is disposed between the at least two battery cells.

* * * * *